(12) United States Patent
Horvath et al.

(10) Patent No.: US 7,689,234 B2
(45) Date of Patent: Mar. 30, 2010

(54) METHOD AND SYSTEM FOR DELIVERY OF SHORT MESSAGE SERVICE MESSAGES

(75) Inventors: Robert Horvath, Arlington Heights, IL (US); Susan C. Billings Urbina, Ingleside, IL (US); Thomas B. Hart, West Dundee, IL (US)

(73) Assignee: Motorola, Inc., Schaumborg, IL (US)

( * ) Notice: Subject to any disclaimer, the term of this patent is extended or adjusted under 35 U.S.C. 154(b) by 362 days.

(21) Appl. No.: 11/380,991

(22) Filed: May 1, 2006

(65) Prior Publication Data

US 2007/0254681 A1 Nov. 1, 2007

(51) Int. Cl.
*H04Q 7/20* (2006.01)

(52) U.S. Cl. .................... 455/466; 455/464; 455/552.1; 370/354; 370/355; 370/356; 370/357; 709/207

(58) Field of Classification Search ................. 455/466, 455/41.2, 464, 552.1; 709/207; 370/354, 370/355, 356, 357
See application file for complete search history.

(56) References Cited

U.S. PATENT DOCUMENTS

| | | | |
|---|---|---|---|
| 6,678,526 B1 * | 1/2004 | Sugirtharaj | ................. 455/450 |
| 7,039,007 B1 * | 5/2006 | Abdelhamid et al. | ........ 370/218 |
| 2002/0006125 A1 | 1/2002 | Josse et al. | |
| 2002/0006793 A1 | 1/2002 | Kun-Szabo et al. | |
| 2006/0031368 A1 * | 2/2006 | deCone | ...................... 709/207 |
| 2006/0094415 A1 | 5/2006 | Veron | |
| 2006/0154605 A1 * | 7/2006 | Ham | ......................... 455/41.2 |

* cited by examiner

*Primary Examiner*—Vincent P Harper
*Assistant Examiner*—Fred A Casca (57) ABSTRACT

A method and device for transmitting at least one short messaging service message to at least one wireless device are disclosed. The method comprises receiving at least one short message service message request associated with a short message service message. The short message service message is destined for reception by a wireless device (106). Prior to receiving the request, a short message service center (114) determines if a wireless device (106) is registered with a registrar (210) associated with a session initiation protocol network for communicating over a packet data network (102). The short message service message is transmitted to the wireless device (106) through the session initiation protocol network communicating over the packet data network (102) in response to the request and with the determination that the wireless device (106) is registered with the registrar (210).

22 Claims, 7 Drawing Sheets

METHOD AND SYSTEM FOR DELIVERY OF SHORT MESSAGE SERVICE MESSAGES

FIELD OF THE INVENTION

The present invention generally relates to the field of wireless communications, and more particularly relates to transmitting short message service messages over packet data networks and circuit services networks.

BACKGROUND OF THE INVENTION

Short message service ("SMS") is a service that allows a wireless device such as a mobile phone to send and receive short messages from other wireless devices. Traditionally, SMS messages are sent over circuit services networks such as Code Division Multiple Access ("CDMA") 1× networks. SMS messages transmitted by a wireless device, computer, and the like, are received by a Short Message Service Center ("SMSC"), which allows the wireless devices to exchange SMS messages between each other. Once the SMSC receives an SMS message, it sends a SMS Request to a home location register ("HLR") to locate the intended recipient of the SMS message. The HLR is a database that holds subscription information associated with wireless devices subscribing in the circuit services network.

The HLR transmits information associated with the intended recipient device such as the device's status and current location. The SMSC is then able to contact the mobile switching center ("MSC") that the recipient device has registered with in order to deliver the SMS message.

One problem with the traditional way of transmitting SMS messages discussed above is that the circuit services network is primarily used for voice services. The circuit services network is unnecessarily burdened with SMS traffic. Network resources such as air interface capacity and MSC capacity, among other things, are decreased. To overcome this problem, carrier providers implement wireless communication systems that utilize a packet data network for transmission of SMS messages. However, in these systems, the SMSC does not have knowledge of the registration status of the intended recipient device. Therefore, the SMSC needs to query a home subscriber server ("HSS") to determine the registration status of the recipient device. This process creates unnecessary overhead for the system.

Therefore a need exists to overcome the problems with the prior art as discussed above.

SUMMARY OF THE INVENTION

Briefly, in accordance with the present invention, disclosed are a method and device for transmitting at least one short messaging service message. The method comprises receiving at least one short message service message request associated with a short message service message. The short message service message is destined for reception by a wireless device. Prior to receiving the request, a short message service center determines if a wireless device is registered with a registrar associated with a session initiation protocol network for communicating over a packet data network. The short message service message is transmitted to the wireless device through the session initiation protocol network communicating over the packet data network in response to the request and with the determination that the wireless device is registered with the registrar.

In another embodiment, a method, with a wireless device, for transmitting a short messaging service message is disclosed. The method comprises determining, by the wireless device, whether it is currently registered with a registrar associated with a session initiation protocol network for communicating over a packet data network and a circuit services network. At least one short message service message is transmitted, in response to being registered with the registrar, through the session initiation protocol network communicating over the packet data network to at least one wireless device. If the wireless device is unregistered with the registrar, the at least one short message service message is transmitted through a circuit services network to the at least one wireless device.

In yet another embodiment, a short message service center in a wireless communication system for delivering at least one short service message to at least one wireless device is disclosed. The short message service center comprises a receiver for receiving at least one short message service message request associated with a short message service message. The short service message is destined for reception by a wireless device. A wireless device registration monitor determines, prior to receiving the request, a registration status associated with the wireless device. A network delivery selector selects one of a packet data network and a circuit services network for delivering a short message service message to at least one wireless device based on the registration status of the wireless device.

An advantage of the foregoing embodiments of the present invention is that the transmission of SMS messages can be done on a packet data network as compared to a circuit services network. If delivery of the SMS message is not possible on the packet data network, the system of the present invention is able to select the circuit services network for SMS delivery. Another advantage of the present invention is that the SMSC has knowledge of which network the recipient device is currently registered on prior to receiving a message for the device. A further advantage of the present invention is that a wireless device is able to select either a packet data network or a circuit services network to transmit a SMS message depending on what type of network it is currently registered with.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

The presently claimed invention, according to an embodiment, overcomes problems with the prior art by transmitting SMS messages on a packet data network as compared to a circuit services network. If delivery of the SMS message is not possible on the packet data network, the system of the present invention is able to select the circuit services network for SMS delivery. Another advantage of the present invention is that the SMSC has knowledge of which network the recipient device is currently registered on prior to receiving a message for the device. A further advantage of the present invention is that a wireless device is able to select either a packet data network or a circuit services network to transmit a SMS message depending on what type of network it is currently registered with.

The term wireless device is intended to broadly cover many different types of devices that can wirelessly receive signals, and optionally can wirelessly transmit signals, and may also operate in a wireless communication system. For example, and not for any limitation, a wireless communication device can include any one or a combination of the following: a cellular telephone, a mobile phone, a smartphone, a two-way radio, a two-way pager, a wireless messaging device, a laptop/computer, automotive gateway, residential gateway, and the like.

Exemplary Wireless Communications System

Figure 1:
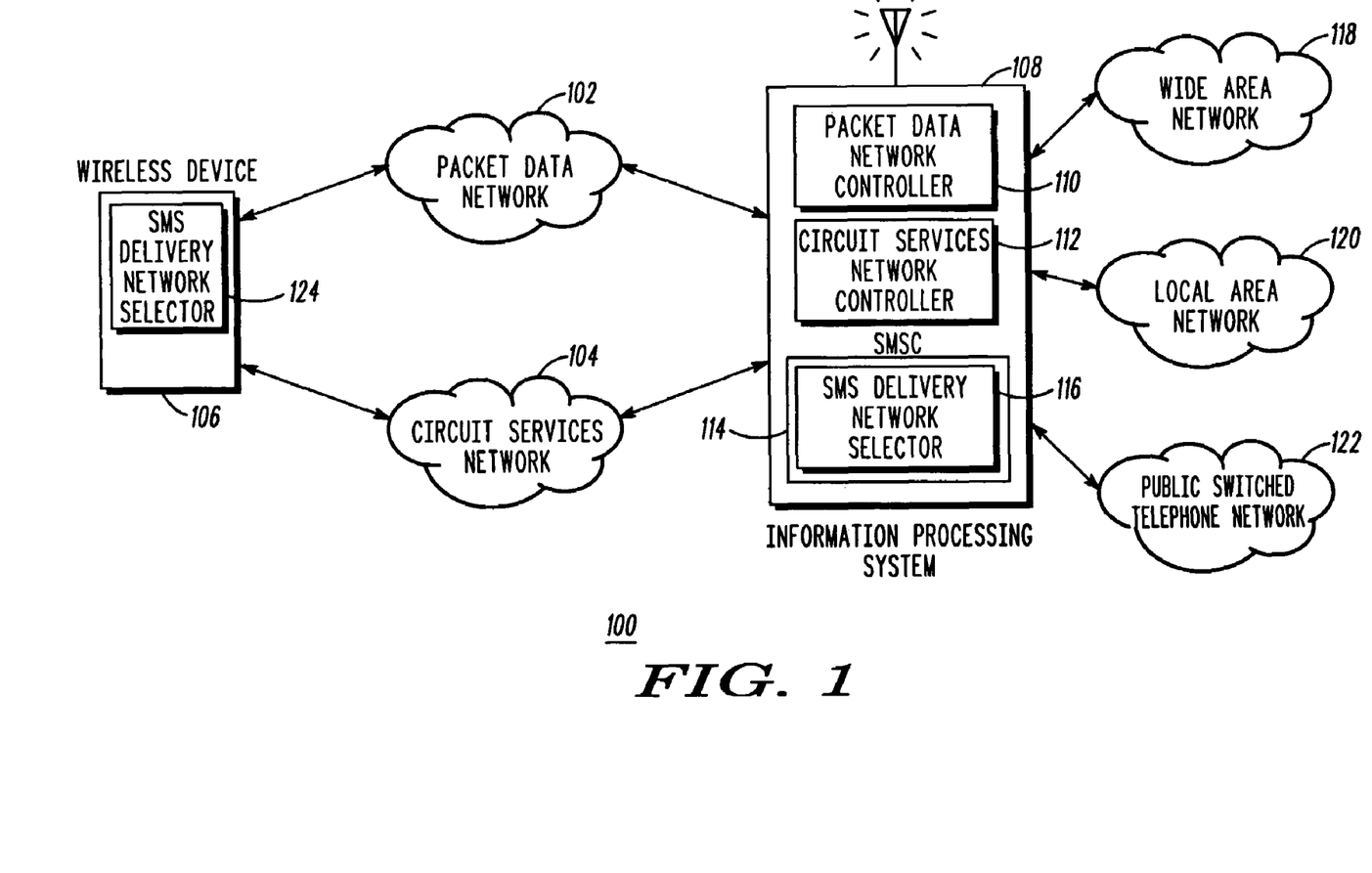
FIG. 1 is block diagram illustrating an exemplary wireless communication system, according to an embodiment of the present invention.

According to an embodiment of the present invention, as shown in FIG. 1, an exemplary wireless communication system 100 is illustrated. FIG. 1 shows a packet data network 102 and a circuit services network 104 that connect a wireless device 106 to an information processing system 108. The wireless device 106 includes a SMS delivery network selector 124. The wireless device 106 and the SMS delivery network selector 124 are discussed in greater detail below. In one embodiment, the packet data network 102 is an Internet Protocol ("IP") connectivity network, which provides data connections at much higher transfer rates then a traditional circuit services network. The packet data network 102, in one embodiment, comprises an Evolution Data Only ("EV-DO") network, a General Packet Radio Service ("GPRS") network, a Universal Mobile Telecommunications System ("UMTS") network, an 802.11 network, an 802.16 (WiMax) network, Ethernet connectivity, dial-up modem connectivity, or the like.

The circuit services network 104, in one embodiment, provides, among other things, voice services to the wireless device 106. The packet data network 102 and the circuit services network 104 can each comprise a mobile text messaging device network, a pager network, or the like. Text messaging standards such as Short Message Service ("SMS"), Enhanced Messaging Service ("EMS"), Multimedia Messaging Service ("MMS"), and the like are also included in the networks 102, 104.

Further, the communications standard of the packet data network 102 and the circuit services network 104 may comprise Code Division Multiple Access (CDMA), Time Division Multiple Access (TDMA), Global System for Mobile Communications (GSM), General Packet Radio Service (GPRS), Frequency Division Multiple Access (FDMA), Orthogonal Frequency Division Multiplexing (OFDM), or the like. The networks 102, 104 also allow for push-to-talk over cellular communications between capable wireless communication devices.

The packet data network 102 and the circuit services network 104 support any number of wireless devices 106. The support of the networks 102, 104 includes support for mobile telephones, smart phones, text messaging devices, handheld computers, pagers, beepers, or the like. A smart phone is a combination of 1) a pocket PC, handheld PC, palm top PC, or Personal Digital Assistant (PDA), and 2) a mobile telephone. More generally, a smartphone can be a mobile telephone that has additional application processing capabilities. In one embodiment, the wireless networks 102, 104 allow for mesh networking between the wireless devices 106.

Figure 2:
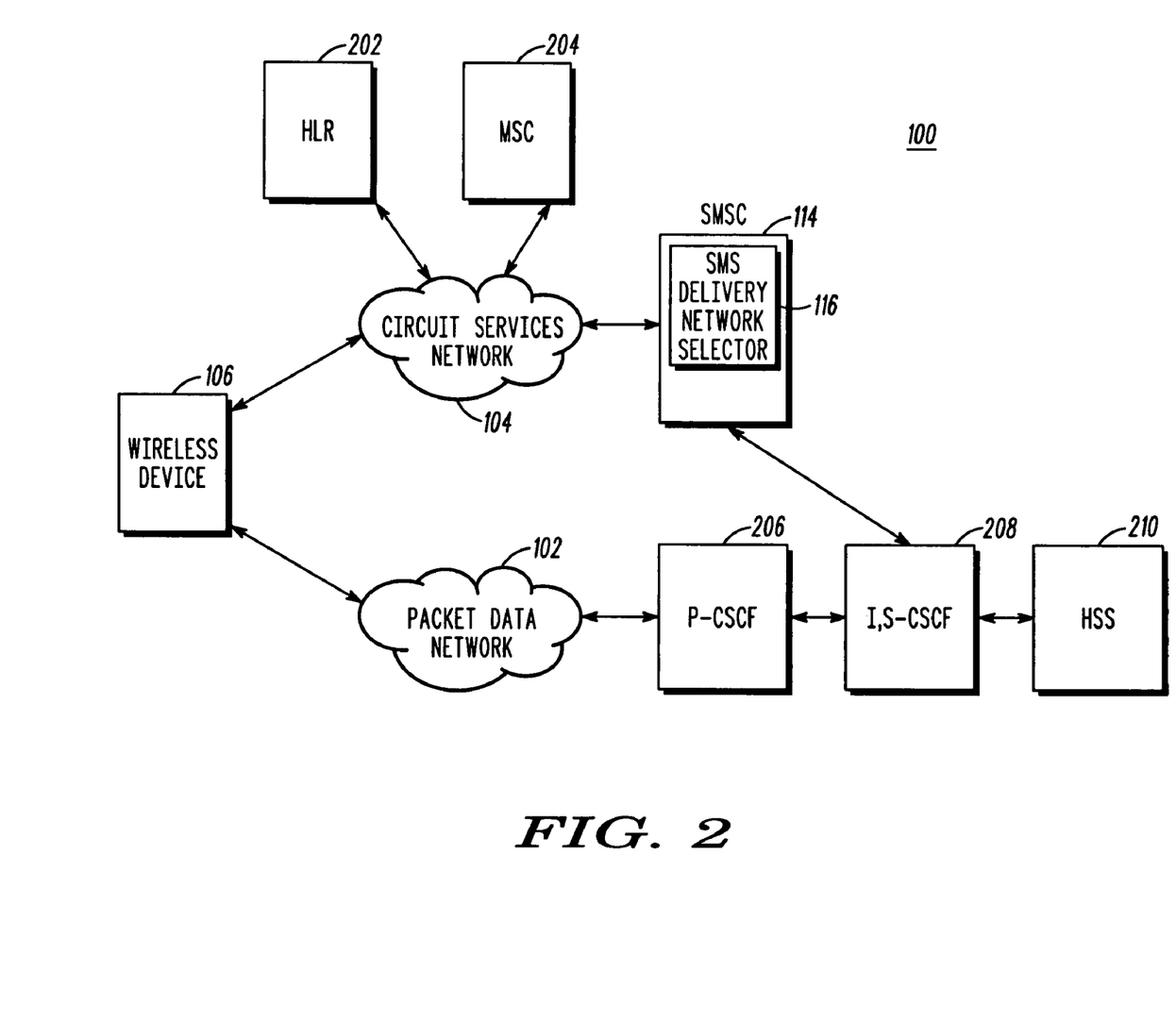
FIG. 2 is a block diagram illustrating a more detailed view of the wireless communication system of FIG. 1 according to an embodiment of the present invention.

The wireless communication system 100 also includes an information processing system 108 that maintains and controls the packet data network 102 and the circuit services network 104. For example, the information processing system 108 includes, in one embodiment, a packet data network controller 110 and a circuit services network control 112 for maintaining each network 102, 104, respectively. As illustrated in FIG. 2, an SMSC 114 with a SMS delivery network selector 116 is also included in the information processing system 108. The SMSC 114 and the SMS delivery network selector 116 are discussed in greater detail below.

Additionally, the information processing system 108 communicatively couples the wireless communications device 106 to a wide area network 118, a local area network 120, and a public switched telephone network 122 through the packet data network 102 and the circuit services network 104. Each of these networks 118, 120, 122 has the capability of sending data, for example, a multimedia text message to the wireless devices 106.

Exemplary System for SMS Transmission/Delivery

FIG. 2 is a block diagram showing a more detail view of the wireless communication system of FIG. 1 for transmission/delivery of SMS messages. As described above, the wireless communication system 100 comprises one or more wireless devices 106 that are communicatively coupled to the packet data network 102 and the circuit services network 104. In one embodiment, a home location register ("HLR") 202 and a mobile switching center ("MSC") 204, among other things are communicatively coupled to the circuit services network 104. The HLR 202 helps route calls, SMS messages, and the like and ensures security. The HLR 202 includes an authentication center (not shown). The authentication center (not shown), comprises a database including information associated with a wireless device subscribing to the circuit services network 104. Subscriber information, in one embodiment, comprises access right(s) and/or a service(s) subscribed to by the wireless device 106.

The MSC 204 comprises the location of the Digital Access and Cross connect System ("DACS") in the wireless communication system 100. In one embodiment, the MSC 204 manages communications between the wireless device 106 and the PSTN 122 and controls switching functions. The MSC 204 provides, among other things, circuit-switched calling and mobility management. For example, the MSC provides SMS, voice, and data and fax services. The MSC 204 can be a gateway MSC, which interfaces with the PSTN 122. A gateway MSC also determines which visited MSC a current recipient subscriber is currently located with. All calls between wireless communication devices and the PSTN 122 are routed through the gateway MSC. The MSC 204 can also be a visited MSC, which is the MSC where a wireless device is currently located. It should be noted that other network components besides the HLR 202 and the MSC 202 are communicatively coupled to the circuit services network 104 as would be understood to those of ordinary skill in the art.

In one example, the HLR 202 is a signaling system 7 ("SS7 database"). SS7 is a set of telephony signaling protocols used to achieve connection control in a telephony network. FIG. 2 also shows the SMSC 114 communicatively coupled to the circuit services network 104 and communicatively coupled to the packet data network 102 via a proxy call session control function ("P-CSCF") 206. An interrogating/serving call session control function ("I,S-CSCF") 208 and a registrar such as a home subscriber server ("HSS") 210 are communicatively coupled to the P-CSCF 206. In one embodiment the P-CSCF 206, I,S-CSCF 208, and HSS 210 are part of a session initiation protocol ("SIP") network. The I,S-CSCF 208, in one embodiment, can be implemented as two separate components, an Interrogating call session control function and a serving call session control function. In one embodiment, the SMSC 114 is also part of the SIP network. The SIP network is used for establishing instant messaging, telephone calls, and other real-time communications over the Internet. The SIP network allows for IP telephony services to be integrated in a wireless communication system.

The P-CSCF 206, I,S-CSCF 208, and HSS 210 also comprise part of an Internet Protocol multimedia subsystem ("IMS") core that supports the SIP network. In one embodiment, the SMSC 114 is also part of the IMS core. IMS is a Next Generation Networking architecture for mobile and fixed IP services. IMS uses a Voice-over-IP implementation and runs over the standard IP. The wireless device 106 can connect to the IMS network using different methods, which all use standard IP. For example, when a wireless device 106 wants to access the packet data network 102, the wireless device 106 registers with the IMS network. The basic functions of an IMS network should be known to those or ordinary skill in the art.

The HSS 210 comprises a database including profiles associated with each wireless device 106 registered with the IMS. A profile, for example, includes subscription related information. The HSS 210 also performs authentication and authorization of the wireless device 106. The HSS 210 also provides information about the physical location to requesting entities such as the SMSC 114. The HSS 210 also includes information to identify each registered wireless device 106 such as a telephone uniform resource identifier ("tel-URI") and/or a SIP uniform resource identifier ("SIP-URI"). A tel-URI, for example is the telephone number assigned to the wireless device 106. The P-CSCF 206 and the I,S-CSCF 208 are SIP servers (proxies) that are used to process SIP signaling packets in an IMS network.

The P-CSCF 206 is a SIP proxy and is the first contact point for a wireless device 106 registered in the IMS network. In one embodiment, the wireless device 106 locates its respective P-CSCF 206 via a dynamic host configuration protocol ("DHCP"). The wireless device 106 is assigned to a specific P-CSCF 206 for the duration of the device's subscription to the IMS network. All signaling messages are intercepted by the P-CSCF 206 allowing the P-CSCF 206 to inspect the messages. The P-CSCF 206 authenticates the wireless device 106 and is trusted by the other IMS components, which therefore do not perform further authentication of the wireless device 106. For example, after successful registration of a wireless device 106 with the S-CSCF component of the I,S-CSCF 208, security keys are sent to the P-CSCF 206, which allows it to setup a security association with the wireless device 106. The P-CSCF 206 can authenticate subsequent messages allowing the other network entities such as the I,S-CSCF 208 to trust the messages. Other functions of the P-CSCF 206 should be known to those of ordinary skill in the art.

An interrogating CSCF ("I-CSCF"), which is shown as part of the I,S-CSCF 208, is also a SIP proxy. The IP address of the I-CSCF is published in the domain name system ("DNS") of the domain. This allows for remote servers such as a P-CSCF 206 residing in a visited domain or a serving CSCF ("S-CSCF") in a foreign domain to locate the I-CSCF. The remote servers use the I-CSCF as an entry point for all SIP packets to the domain where the I-CSCF is located. The I-CSCF retrieves the location of the wireless device 106 so that a SIP request associated with the device 106 can be routed to the S-CSCF assigned to the device 106.

The S-CSCF, which is shown as part of the I,S-CSCF 2108, is a SIP server, but also performs session control. The S-CSCF is located in the home network of the wireless device 106. The S-CSCF retrieves device profiles from the HSS 210. The S-CSCF also handles SIP registrations which allows the S-CSCF to bind the location of the wireless device 106 (for example, the IP address of the device) and the SIP address. The S-CSCF can intercept all of the signaling messages in the IMS so that it can inspect each message. The S-CSCF also determines which application server(s) to forward the SIP message associated with the wireless device 106 so that the services subscribed to by the device 106 can be provided. Other functions of the S-CSCF should be known to those of ordinary skill in the art. Although, the SMSC 114, C-CSCF 206, I,S-CSCF 208, and HSS 210 are shown as separate components, each respective component can reside on the same or separate information processing system.

An IMS system also includes application servers that host and execute services for the wireless device 106. A service for example, is SMS, MMS, caller ID, call waiting, push-to-talk, voicemail, and the like. An application server interfaces with the S-CSCF component of the I,S-CSCF 208 using SIP. In one embodiment of the present invention, the SMSC 114 acts as an application server for transmitting/delivering SMS messages to the wireless device 106 through the packet data network 102 using the IMS network. In other words, the SMSC 114 includes SIP/IMS capabilities to deliver SMS messages to the wireless device 106. The present invention moves the traditional circuit service SMS off of the IS-41 based circuit network 104 (for example, off of the 1× air interface and off the IS-41 MSC) to the IMS-based data network (for example, the packet data network 102). This provides capacity relief on the circuit services network 104. The present invention is not limited to the IS-41 based circuit network. Other networks such as a GSM map circuit network can also be used, as should be obvious to those of ordinary skill in the art in view of the present discussion.

For delivery of an SMS message via the packet switched network 102, the wireless device, in one embodiment, is registered with the IMS core. The wireless device 106 registers with the S-CSCF component of the I,S-CSCF 208. When the S-CSCF receives a registration request from the wireless device 106, the S-CSCF contacts the HSS 210 for authentication and authorization of the wireless device 106. Upon being authenticated by the S-CSCF, a security association between the wireless device 106 and the P-CSCF, in one embodiment, is established.

In one embodiment of the present invention, the HSS 210 includes filter criteria for the wireless device 106 that causes registration events to be sent to the SMSC 114, which is acting as an SIP application server. The filter criteria, in one embodiment, are sent to the S-CSCF as part of the authorization process of the wireless device 106. A subscriber profile sent to the S-CSCF includes the filter criteria which are used by the S-CSCF to determine the application servers that are to be notified that they are to provide services for the wireless device 106. In one embodiment, part of the filter criteria includes conditions such that, when the conditions are satisfied, the S-CSCF notifies the SMSC 114 that the wireless device 106 has registered with the packet data network 102. In one embodiment, the S-CSCF notifies the SMSC 114 that the wireless device 106 has registered by transmitting a SIP REGISTER message to the SMSC 114. The S-CSCF also transmits SIP contact information associated with the wireless device 114 so that the SMSC 114 can deliver a SMS message to the wireless device 106 (for example, via a SIP MESSAGE method). The SMSC 114 does not have to authenticate the wireless device 106 because the S-CSCF 206 has already done so.

One advantage of the present invention is that the SMSC 114 does not have to contact the HSS 210 to determine if the wireless device 106 is registered on the data network 102. For example, the S-CSCF notifies the SMSC 114 that the wireless device 106 is registered on the data network 102 as soon as the registration takes place. The SMSC 114 does not have to wait to receive a SMS message request associated with the wireless device 106 and then query the HSS 210 to determine the registration status of the wireless device 106.

In one embodiment, after receiving the notification of registration from the S-CSCF, the SMSC 114 subscribes to a registration event package at the S-CSCF. By subscribing to the registration event package, the SMSC 114 is notified by the S-CSCF if the registration state of the wireless device 106 is modified (for example, the wireless device 106 is no longer registered with the packet data network 102). In one embodiment, the registration event package is an XML document that includes a list of explicitly and implicitly registered public URIs such as a tel-URI. In another embodiment, the SMSC 114 subscribes to the registration event package prior to receiving a registration notification from the S-CSCF.

For example, the HSS 210 notifies the SMSC 114 of wireless devices 106 capable of receiving SMS messages through the packet data network 102. The SMSC 114 subscribes to a registration event package for each device at the S-CSCF. The S-CSCF notifies the SMSC 114 via the registration event package that the respective device has registered with the packet data network 102.

In one embodiment, when a SMS message request is received by the SMSC 114, the SMSC 114 first determines if the recipient wireless device 106 is registered on the packet data network 102. For example, in an IMS network, the SMSC 114 determines if a registration message for the recipient device has been received from the S-CSCF or if a contact address has been received for the recipient device 106. If the SMSC 114 determines that the recipient device is registered on the packet data network 102, the SMSC 114 delivers the SMS message to the recipient device through the packet data network 102 via the IMS.

In one embodiment, when a SMS message request is received by the SMSC 114, the SMSC 114 first determines if the device 106 is registered on the packet data network, For example, in a non-IMS SIP network, the SMSC 114 subscribes to the registration event package of the device 106, and upon receiving notification of the device having registered at the registrar, determines that the recipient device is registered on the packet data network 102. The SMSC 114 delivers the SMS message to the recipient device through the packet data network 102 via the SIP network.

If the recipient device is not registered on the packet data network 102, the SMSC 114 delivers the SMS message to the recipient device through the traditional circuit services network method (for example, ANSI-41 procedures). The wireless device 106 may not be registered on the packet data network 102 because it never was registered to begin with, because it deregistered, or because it lost its coverage. The traditional circuit services method includes, in part, contacting a registrar such as the HLR 202 to determine which MSC 204 the recipient device is subscribed to. The SMSC 114 then transmits the SMS message to the MSC 204 for delivery to the recipient device. In yet another embodiment, if the SMSC 114 transmits the SMS message to the recipient device through the packet data network 102, but the recipient device does not acknowledge a successful delivery, the SMSC 114 delivers the SMS message using the traditional circuit services network method.

In one embodiment, if the wireless device 106 has lost packet data network coverage and is idle on the circuit services network 104, the SIP MESSAGE transmitted from the SMSC 114 times out waiting for an acknowledgement. The SMSC 114 then transmits the SIP MESSAGE using traditional circuit services network method (for example, ANSI-41 procedures). If the wireless device 106 was active on the packet data network 102 and loses coverage, the wireless device 106 transitions to the circuit services network 104 and creates an active circuit network packet data session. The SMSC 114 delivers the SMS message over the circuit services data path. If the wireless device 106 stops sending data on the circuit network data path and transitions to a circuit services dormant state, the message delivery attempt from the SMSC 114 triggers the re-activation of the dormant circuit services data session. The SMSC 114 delivers the SIP MESSAGE over the circuit services data path.

If the wireless device 106 loses packet data network coverage after receiving the SIP MESSAGE from the SMSC 114 but before sending an acknowledgement back to the SMSC 114, the wireless device 106 can either ignore receipt of the SIP MESSAGE or activate a circuit services data session to send the acknowledgement. If the wireless device 106 ignores the SIP message, the SMSC 114 resends the SMS message using traditional circuit services network method (for example, ANSI-41 procedures). If the wireless device 106 chooses to acknowledge on the circuit services network 104, the wireless device 106 does so on an active circuit services data session.

The wireless device 106, in one embodiment, is configured to transmit SMS messages to another device through the packet data network 102. When the wireless device 106 desires to transmit a SMS message to another device, the wireless device 106 first determines if it is registered on the packet data network 102. If the wireless device 106 is registered on the packet data network 102, the wireless device 106, in one embodiment, encodes the IS-637 content as the payload of the SIP MESSAGE. The SIP message is then sent to the recipient device. In one embodiment, the destination address of the recipient device is a SIP URI formed out of the normal address (for example, tel:MDN). The HSS 210, in one embodiment, is configured with filter criteria that cause SIP MESSAGEs including IS-637 payloads to be sent to the SMSC 114. If the wireless device 106, is not registered on the packet data network 102, the wireless device 106 transmits the SMS messages using the traditional circuit services network method (for example, ANSI-41 procedures).

Exemplary Information Processing System

Figure 3:
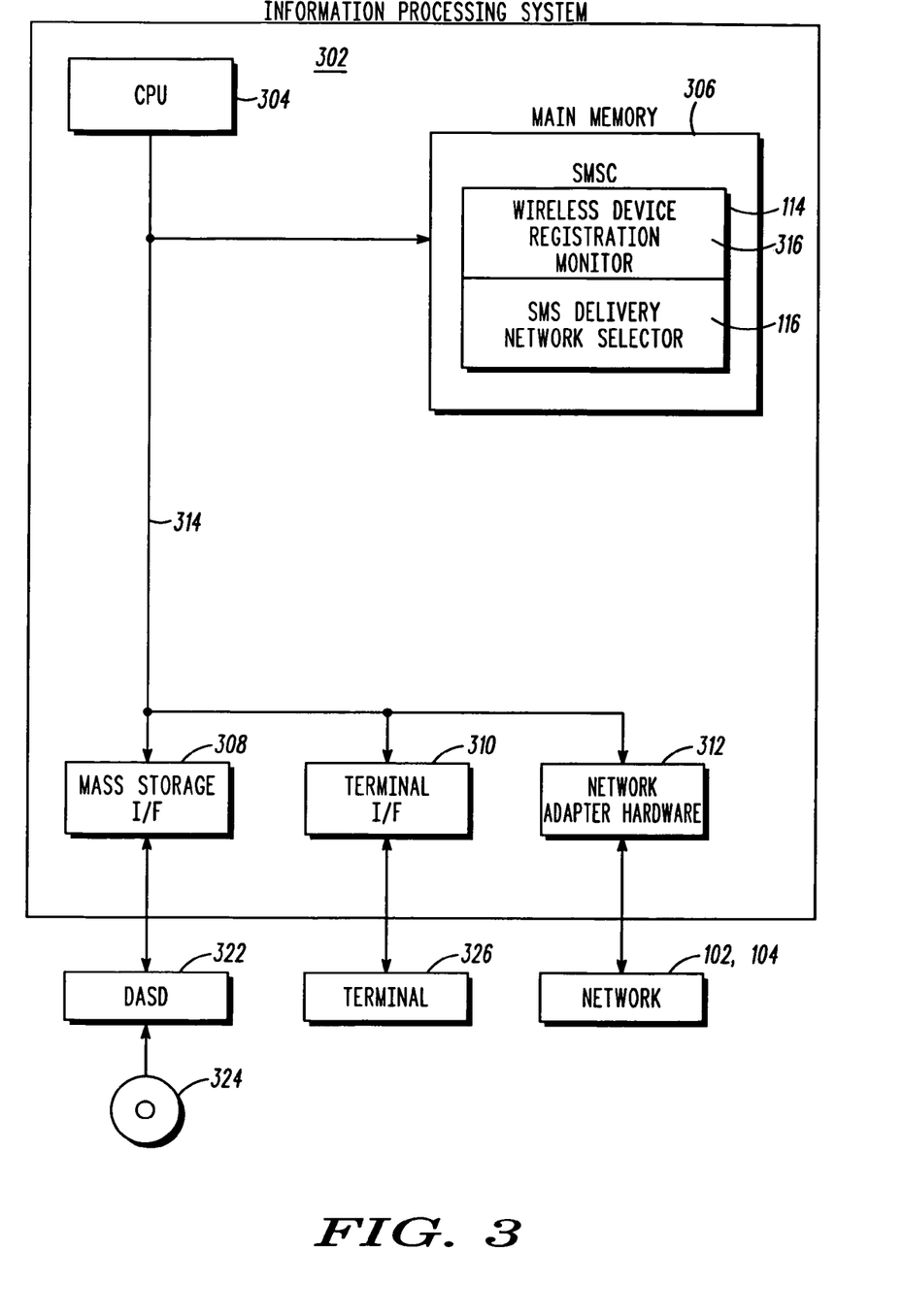
FIG. 3 is a block diagram illustrating an exemplary information processing system according to an embodiment of the present invention.

FIG. 3 is a block diagram illustrating a more detailed view of the information processing system 108 according to an embodiment of the present invention. The information processing system 108 is based upon a suitably configured processing system adapted to implement the exemplary embodiment of the present invention. Any suitably configured processing system is similarly able to be used as the information processing system 108 by embodiments of the present invention. For example, a personal computer, workstation, or the like, may be used. The information processing system 108 includes a computer 302. The computer 302 has a processor 304 that is connected to a main memory 306, a mass storage interface 308, a terminal interface 310, and a network adapter hardware 312. A system bus 314 interconnects these system components. In one embodiment, the main memory 306 includes the SMSC 114. The SMSC 114, in one embodiment, includes a wireless device registration monitor 316 and the SMS delivery network selector 116. Although only the SMSC 114 is shown as residing in the main memory 306, any combination of IMS components such as the P-CSCF 206, I,S-CSCF 208, and HSS 210 can also reside in the main memory 306.

The wireless device registration monitor 316 monitors if a wireless device 106 is registered/unregistered with the packet data network 102 or has become deregistered from the packet data network 102. The SMS delivery network selector 116, based on the registration status of the wireless device 106, selects either the packet data network 102 or the circuit services network 104 for delivery of a SMS message. For example, if a recipient wireless device 106 is registered on the packet data network 102, the SMS delivery network selector 116 selects the packet data network 102 for delivery of an SMS message. If the wireless device 106 is not registered on the packet data network, the SMS delivery network selector 116 selects the circuit services network 104 for delivery of the SMS message.

The mass storage interface 308 is used to connect mass storage devices such as data storage device 322 to the information processing system 108. One specific type of data storage device is a computer readable medium such as a CD drive, which may be used to store data to and read data from a CD 324. Another type of data storage device is a data storage device configured to support New Technology File System ("NTFS") operations, UNIX operations, or the like.

Although illustrated as concurrently resident in the main memory 306, it is clear that respective components of the main memory 306 are not required to be completely resident in the main memory 306 at all times or even at the same time. In one embodiment, the information processing system 108 utilizes conventional virtual addressing mechanisms to allow programs to behave as if they have access to a large, single storage entity, referred to herein as a computer system memory, instead of access to multiple, smaller storage entities such as the main memory 306 and data storage device 322. Note that the term "computer system memory" is used herein to generically refer to the entire virtual memory of the information processing system 108.

Although only one CPU 304 is illustrated for computer 302, computer systems with multiple CPUs can be used equally effectively. Embodiments of the present invention further incorporate interfaces that each includes separate, fully programmed microprocessors that are used to off-load processing from the CPU 304. Terminal interface 310 is used to directly connect one or more terminals 326 to computer 302 to provide a user interface to the information processing system 108. These terminals 326, which are able to be non-intelligent or fully programmable workstations, are used to allow system administrators and users to communicate with the information processing system 108. The terminal 326 is also able to consist of user interface and peripheral devices that are connected to computer 302 and controlled by terminal interface hardware included in the terminal I/F 310 that includes video adapters and interfaces for keyboards, pointing devices, and the like.

An operating system (not shown) included in the main memory is a suitable multitasking operating system such as the Linux, UNIX, Windows XP, and Windows Server 2003 operating system. Embodiments of the present invention are able to use any other suitable operating system. Some embodiments of the present invention utilize architectures, such as an object oriented framework mechanism, that allows instructions of the components of operating system (not shown) to be executed on any processor located within the information processing system 108.

The network adapter hardware 312 is used to provide an interface to the packet data network 102 and the circuit services network 104. Embodiments of the present invention are able to be adapted to work with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via CD, e.g. CD 328, floppy-disk, or other form of recordable media, or via any type of electronic transmission mechanism.

Exemplary Wireless Communication Device

Figure 4:
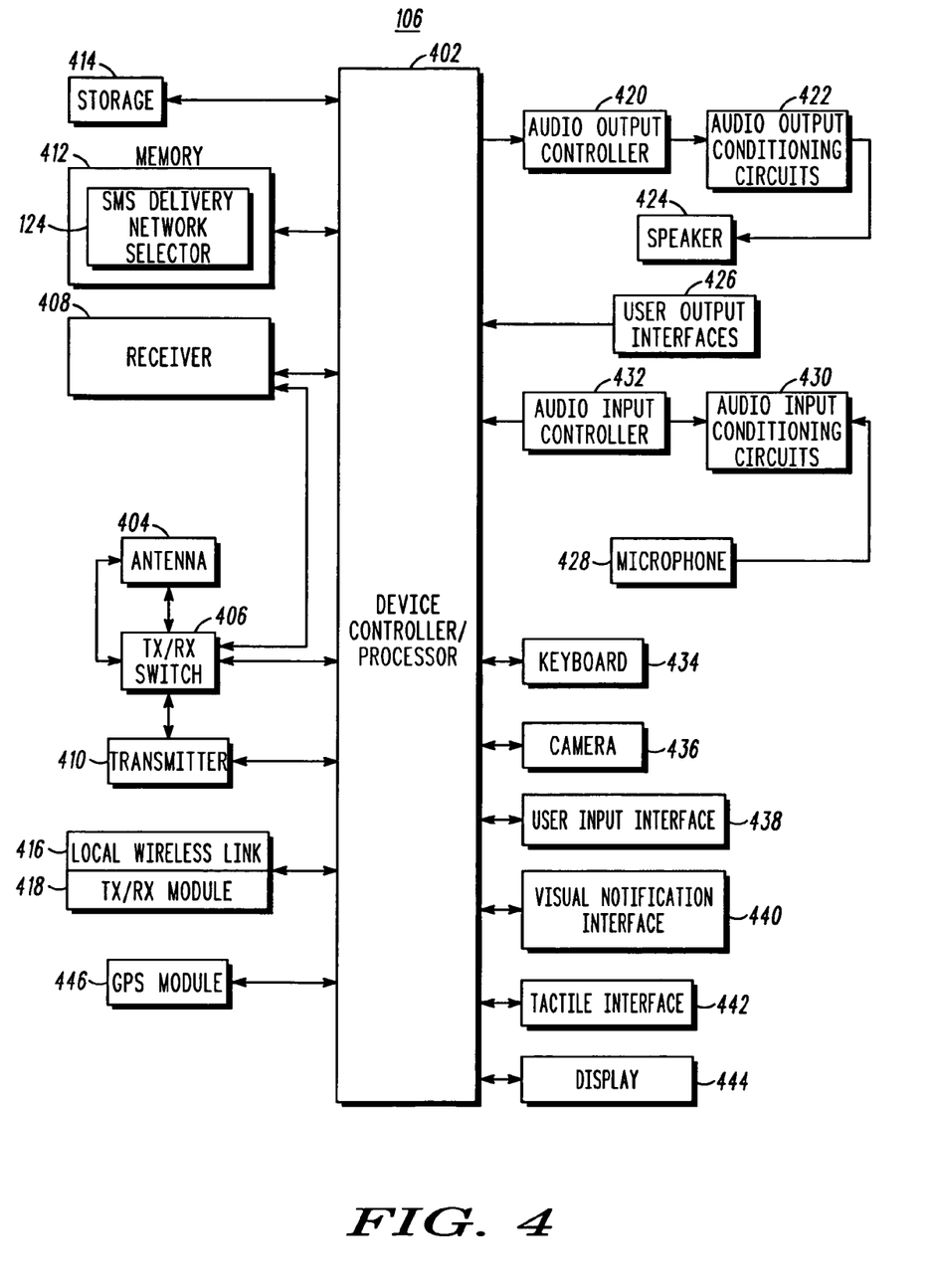
FIG. 4 is a block diagram illustrating an exemplary wireless communication device according to an embodiment of the present invention.

FIG. 4 is a block diagram illustrating a more detailed view of the wireless device 106. In one embodiment, the wireless device 106 is a dual mode device capable of communicating on either the packet data network 102 or the circuit services network 104. The wireless device 106 operates under the control of a device controller/processor 402, that controls the sending and receiving of wireless communication signals. In receive mode, the device controller 402 electrically couples an antenna 404 through a transmit/receive switch 406 to a receiver 408. The receiver 408 decodes the received signals and provides those decoded signals to the device controller 402.

In transmit mode, the device controller 402 electrically couples the antenna 404, through the transmit/receive switch 406, to a transmitter 410. The device controller 402 operates the transmitter and receiver according to instructions stored in the memory 412. These instructions include, for example, a neighbor cell measurement-scheduling algorithm. The memory 412 also includes a SMS delivery network selector 124. The SMS delivery network selector 124 selects a network 102, 104 for the wireless device 106 to transmit a SMS message on. For example, if the wireless device 106 is registered on the packet data network 102, the SMS delivery network selector 124 selects the packet data network 102 for transmission of the SMS message. If the wireless device is not registered on the packet data network 102, the SMS delivery network selector 124 selects the circuit services network 104 for transmission of the SMS message.

The SMS delivery network selector 124 also selects the network 102, 104 for delivery of an acknowledgement message to the SMSC 114 after receiving an SMS message. For example, if the wireless device 106 received a SMS message on the packet data network 102, the SMS delivery network selector 124 selects the packet data network 202 to transmit the acknowledgment on. Continuing with the example, if the SMS message was received on the circuit services network 104, the SMS delivery network selector 124 selects the circuit services network 104 to transmit the acknowledgement on. Other prioritizing of which network to send the contemplated acknowledgement to an SMS is an embodiment of the present invention. For example, a wireless device 106 can always first attempt to send the acknowledgement via the packet data network 102.

The wireless device 106 also includes non-volatile storage memory 414 for storing, for example, an application waiting to be executed (not shown) on the wireless device 106. The wireless device 106, in this example, also includes an optional local wireless link 416 that allows the wireless device 106 to directly communicate with another wireless device without using the wireless network 102. The optional local wireless link 416, for example, is provided by Bluetooth, Infrared Data Access (IrDA) technologies, or the like. The optional local wireless link 416 also includes a local wireless link transmit/receive module 418 that allows the wireless device 106 to directly communicate with another wireless communication device.

The wireless device 106 of FIG. 4 further includes an audio output controller 420 that receives decoded audio output signals from the receiver 408 or the local wireless link transmit/receive module 418. The audio controller 420 sends the received decoded audio signals to the audio output conditioning circuits 422 that perform various conditioning functions. For example, the audio output conditioning circuits 422 may reduce noise or amplify the signal. A speaker 424 receives the conditioned audio signals and allows audio output for listening by a user. The audio output controller 420, audio output conditioning circuits 422, and the speaker 424 also allow for an audible alert to be generated notifying the user of a missed call, received messages, or the like. The wireless device 106 further includes additional user output interfaces 426, for example, a head phone jack (not shown) or a hands-free speaker (not shown).

The wireless device 106 also includes a microphone 428 for allowing a user to input audio signals into the wireless device 106. Sound waves are received by the microphone 428 and are converted into an electrical audio signal. Audio input conditioning circuits 430 receive the audio signal and perform various conditioning functions on the audio signal, for example, noise reduction. An audio input controller 432 receives the conditioned audio signal and sends a representation of the audio signal to the device controller 402.

The wireless device 106 also comprises a keyboard 434 for allowing a user to enter information into the wireless device 106. The wireless device 106 further comprises a camera 436 for allowing a user to capture still images or video images into memory 412. Furthermore, the wireless device 106 includes additional user input interfaces 438, for example, touch screen technology (not shown), a joystick (not shown), or a scroll wheel (not shown). In one embodiment, a peripheral interface (not shown) is also included for allowing the connection of a data cable to the wireless device 106. In one embodiment of the present invention, the connection of a data cable allows the wireless device 106 to be connected to a computer or a printer.

A visual notification (or indication) interface 440 is also included on the wireless device 106 for rendering a visual notification (or visual indication), for example, a sequence of colored lights on the display 444 or flashing one or more LEDs (not shown), to the user of the wireless device 106. For example, a received multimedia message may include a sequence of colored lights to be displayed to the user as part of the message. Alternatively, the visual notification interface 440 can be used as an alert by displaying a sequence of colored lights or a single flashing light on the display 444 or LEDs (not shown) when the wireless device 106 receives a message, or the user missed a call.

The wireless device 106 also includes a tactile interface 442 for delivering a vibrating media component, tactile alert, or the like. For example, a multimedia message received by the wireless device 106 may include a video media component that provides a vibration during playback of the multimedia message. The tactile interface 442, in one embodiment, is used during a silent mode of the wireless device 106 to alert the user of an incoming call or message, a missed call, or the like. The tactile interface 442 allows this vibration to occur, for example, through a vibrating motor or the like.

The wireless device 106 also includes the display 444 for displaying information to the user of the wireless device 106. An optional Global Positioning System (GPS) module 446 is used to determine the location and/or velocity information of the wireless device 106. This module 446 uses the GPS satellite system to determine the location and/or velocity of the wireless device 106. Alternative to the GPS module 446, the wireless device 106 may include alternative modules for determining the location and/or velocity of wireless device 106, for example, using cell tower triangulation and assisted GPS, using accelerometers in the wireless device 106, and other devices and techniques as are known to those of ordinary skill in the art.

Exemplary Processes of Notifying the SMSC of Registration by Device

Figure 5:
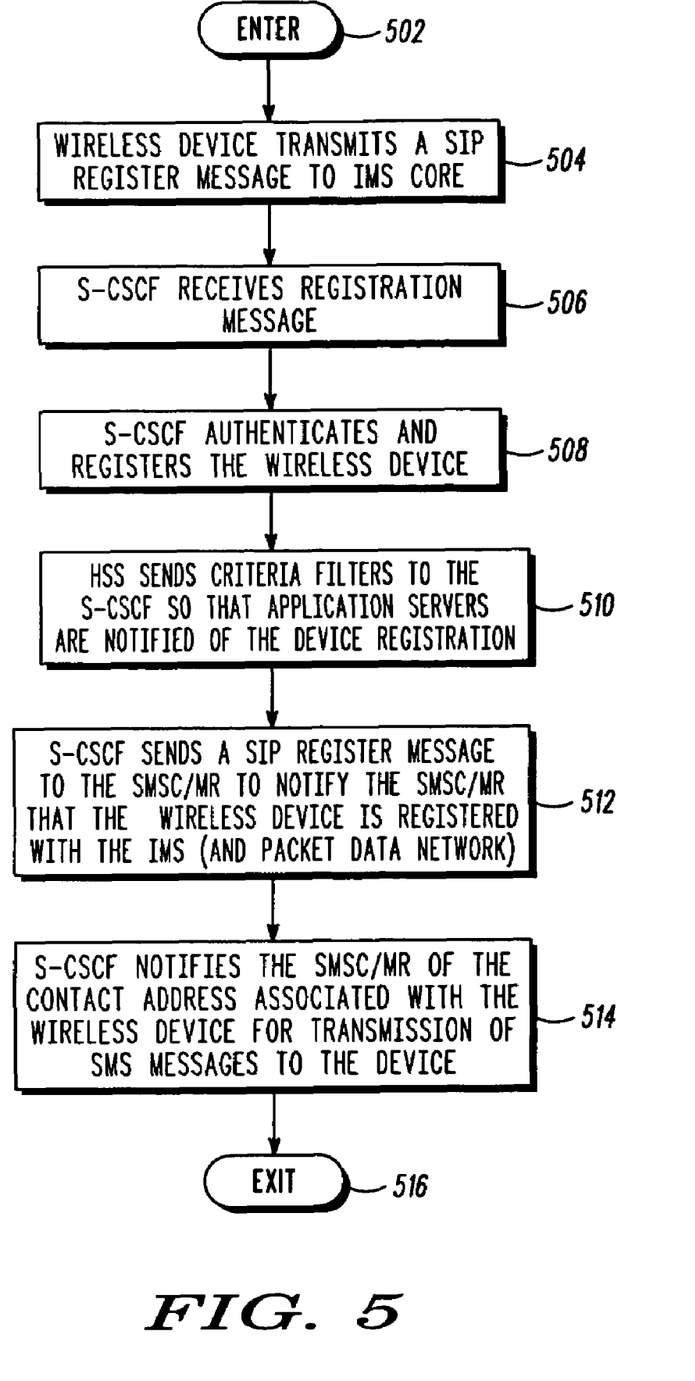
FIG. 5 is an operational flow diagram illustrating an exemplary process of notifying a SMSC, prior to receiving a SMS message for a wireless device, that the wireless device has registered with the packet data network according to an embodiment of the present invention.

FIG. 5 is an operational flow diagram illustrating an exemplary process of notifying the SMSC 114, prior to receiving a SMS message, that the wireless device 106 has registered with the packet data network 102 (via the IMS). The operational flow diagram of FIG. 5 begins at step 502 and flows directly to step 504. The wireless device 106, at step 504, registers with the IMS core by transmitting a SIP register message to the IMS core. The S-CSCF component of the I,S-CSCF 208, at step 506, receives the SIP register message. The S-CSCF component of the I,S-CSCF 208, at step 508, authenticates and registers the wireless device 106 with the IMS core. For example, the S-CSCF receives a profile associated with the wireless device 106 from the HSS 210 to authenticate the wireless device 106 as discussed above with respect to FIG. 2.

The S-CSCF, at step 510, receives filter criteria from the HSS 210 to notify specific application servers that the wireless device 106 has registered with the packet data network 102. The S-CSCF, at step 512, also notifies the SMSC 114 that the wireless device 106 has registered with the packet data network 102. The S-CSCF, at step 514, also notifies the SMSC 114 of the contact address (for example, tel-URI) of the wireless device 106, preferably by use of a SIP Register message, so that SMSC 114 can deliver SMS messages to the registered wireless device 106. In another embodiment, the SMSC 114 registers with a registration event package at the S-CSCF. The SMSC 114 can register with the registration event package either before or after receiving registration information from the S-CSCF. If the SMSC 114 registers after receiving registration information about the wireless device 106, any change in the registration status of the wireless device 106 is forwarded to the SMSC 114. If the SMSC 114 subscribes to the registration event package prior to receiving registration information, the registration event package causes the SMSC 114 to be notified when the wireless device 106 registers with the IMS core. The control flow then exits at step 516.

Exemplary Processes of Selecting a Network for SMS Delivery

Figure 6:
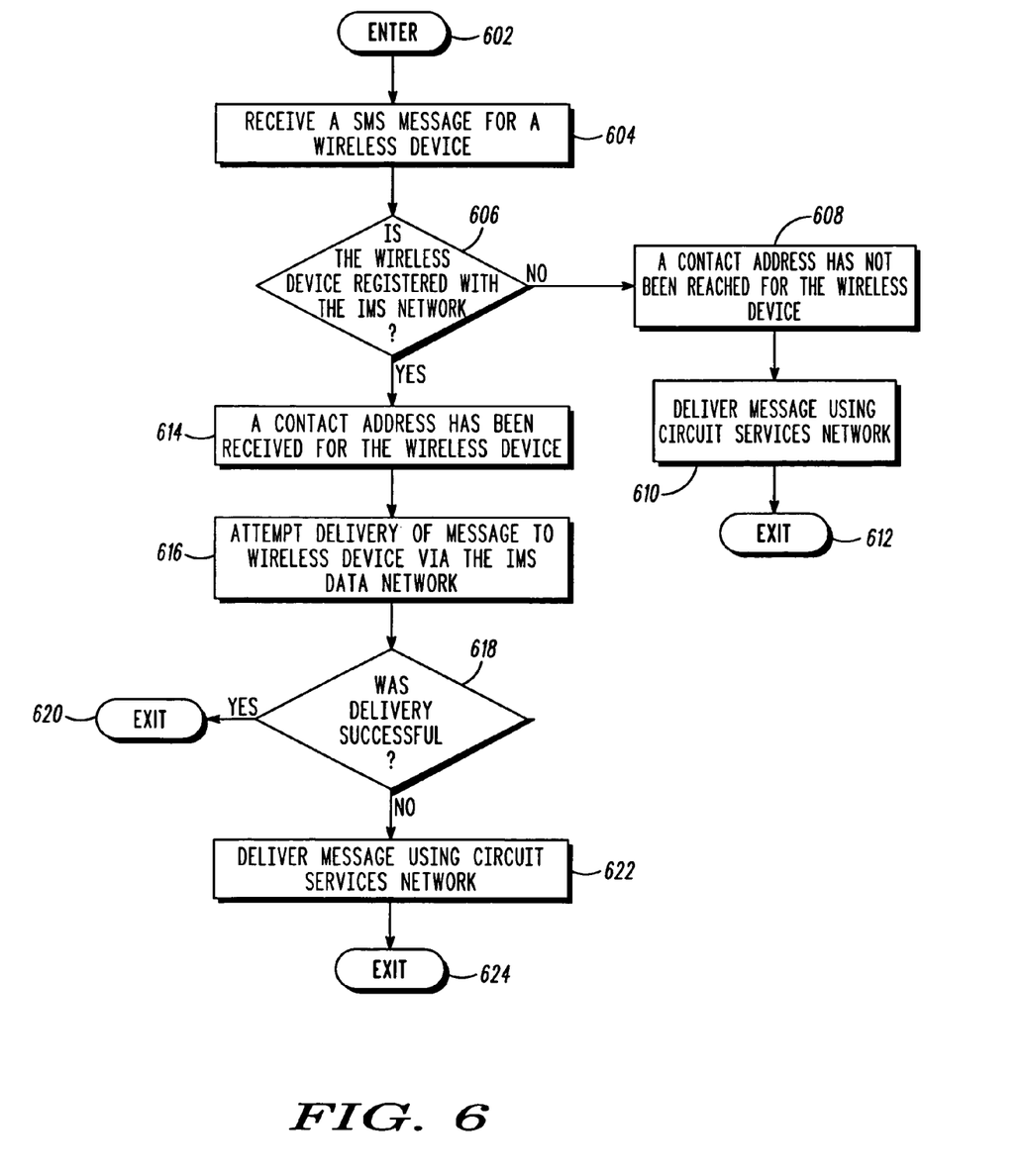
FIG. 6 is an operational flow diagram illustrating an exemplary process of a SMSC selecting either a circuit services network or a packet data network for delivery of a SMS message to a wireless device according to an embodiment of the present invention.

FIG. 6 is an operational flow diagram illustrating an exemplary process of the SMSC 114 selecting either the packet data network 102 or the circuit services network 104 for delivery of a SMS message. The operational flow diagram of FIG. 6 begins at step 602 and flows directly to step 604. The SMSC 114, at step 604, receives a SMS request associated with the wireless device 106. The SMSC 114, at step 606, determines if the wireless device 106 is registered on the packet data network 102. For example, the SMSC 114 determines if a SIP REGISTER message was received from the S-CSCF component of the I,S-CSCF 206, if a contact address was received for the wireless device 106, if the wireless device 106 has deregistered from the packet data network 102, or the like. The SMSC 114 is informed of the registration status by the S-CSCF prior to the SMSC 114 receiving the SMS message. The SMSC 114 analyzes local information at step 606 to makes its determination.

If the determination, at step 606, is negative, then an IMS contact address, at step 608, does not exist for the wireless device 106. The SMSC 114, at step 610, delivers the SMS message through the traditional circuit services network method (for example, ANSI-41 procedures). The control flow then exits at step 612. If the determination, at step 606, is positive, an IMS contact address, at step 614, exists for the wireless device 106. The SMSC 114, at step 616, attempts delivery of the SMS message to the wireless device 106 via the packet data network 102. The SMSC 114, at step 618, determines if delivery of the SMS message though the packet data network was successful (i.e. has an acknowledgement been received). If the determination, at step 618, is positive, the control flow then exits at step 620. If t the determination, at step 618, is negative, the SMSC 114, at step 622, delivers the SMS message using the traditional circuit services network method (for example, ANSI-41 procedures). The control flow then exits at step 624.

Exemplary Process of a Wireless Device Sending a SMS Message

Figure 7:
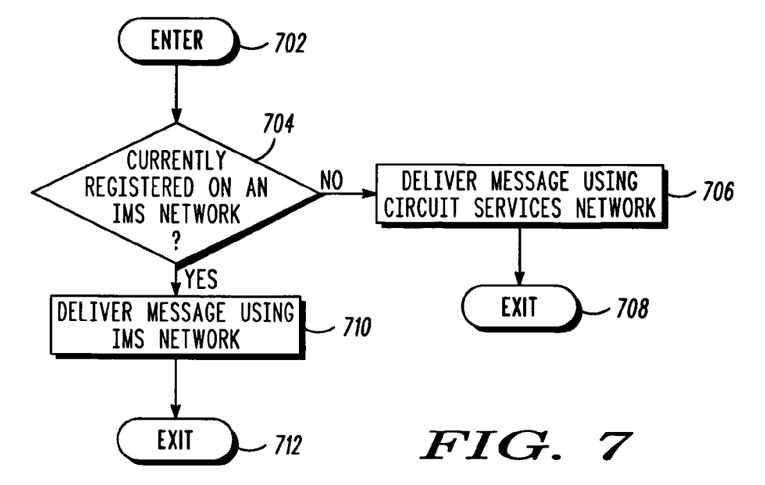
FIG. 7 is an operational flow diagram illustrating an exemplary process of a wireless device selecting a network for transmitting a SMS message based on what network the wireless device is registered with according to an embodiment of the present invention.

FIG. 7 is an operational flow diagram illustrating an exemplary process of the wireless device 106 selecting either the packet data network 102 or the circuit services network 104 for transmission of a SMS message. The operational flow diagram of FIG. 7 begins at step 702 and flows directly to step 704. The wireless device 106, at step 704, determines if it is registered on the packet data network 102. If the result of this determination is negative, the wireless device 106, at step 706, transmits the SMS message through the traditional circuit services network method (for example, ANSI-41 procedures). The control flow then exits at step 708. If the result of this determination is positive, the wireless device 106, at step 710, transmits the SMS message to the recipient device through the packet data network 102, as discussed above with respect to FIG. 2. The control flow then exits at step 712.

Exemplary Process of a Wireless Device Receiving a SMS Message

Figure 8:
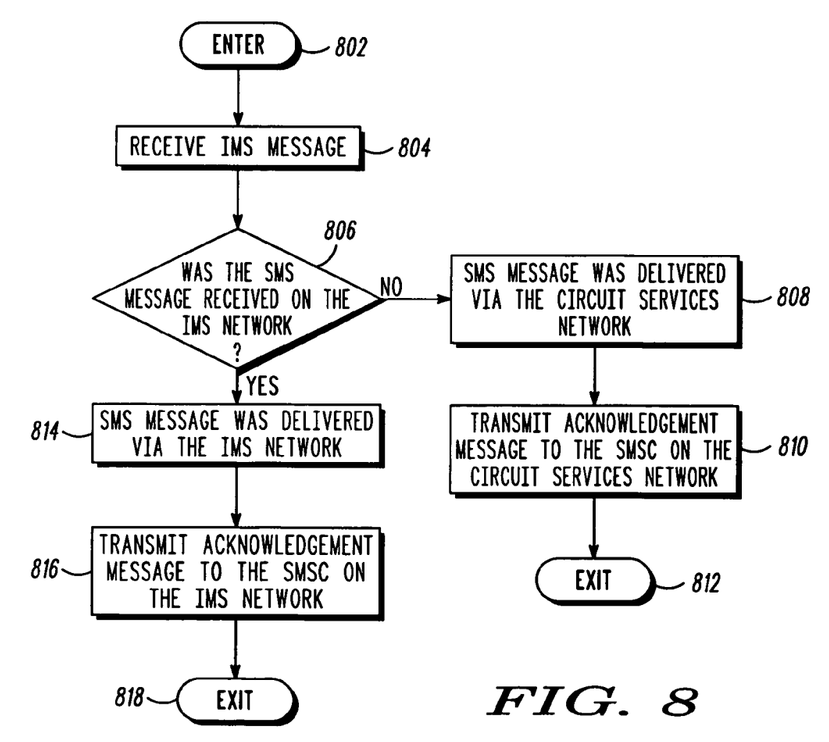
FIG. 8 is an operational flow diagram illustrating an exemplary process of a wireless device receiving a SMS message and selecting a network to transmit an acknowledgement packet on according to an embodiment of the present invention.

FIG. 8 is an operational flow diagram illustrating an exemplary process of the wireless device 106 receiving a SMS message and sending an acknowledgement back to the SMSC 114. The operational flow diagram of FIG. 8 begins at step 802 and flows directly to step 804. The wireless device 106, at step 804, receives a SMS message. The wireless device 106, at step 806, determines if the SMS message was received through the packet data network 102. If the result of this determination is negative, the wireless device 106 determines, at step 808, that the SMS message was received through the circuit services network 104. The wireless device 106, at step 810, transmits an acknowledgement back to the SMSC 114 through the circuit services network 104. The control flow then exits at step 812. If the result of this determination is positive, the wireless device 106 determines, at step 814, that the SMS message was received through the packet data network 102. The wireless device 106, at step 816, transmits an acknowledgement back to the SMSC 114 through the packet data network 102. The control flow then exits at step 818.

NON-LIMITING EXAMPLES

The foregoing embodiments of the present invention are advantageous because they provide dynamic optimization of the resources available to wireless communication information to wireless communication devices using unicast broadcast/multicast communication modes. Information can be wireless communicated to a wireless communication device in a more manner thereby optimizing network resources. A further advantage is that a base-station controller controls the switching between wireless communication modes. The wireless communication mode is based on the number of time-slots needed to transmit requested data. Another advantage is that the base station controller prepares wireless communication devices for a communication mode prior to a hand-off event thereby minimizing transmission gaps when crossing seams.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method, with a short message service center operating in a wireless communication system comprising a plurality of wireless devices, for transmitting at least one short messaging service message to at least one wireless device, the method comprising:

receiving at least one short message service message request associated with a short message service message destined for reception by a wireless device;

locally maintaining, prior to receiving the request, registration information indicating whether the wireless device is registered with a registrar associated with a session initiation protocol network for communicating over a packet data network;

determining, based on the locally maintained information, whether the wireless device is registered with the registrar;

transmitting, in response to the request and with the determination that the wireless device is registered with the registrar, the short message service message to the wireless device through the session initiation protocol network communicating over the packet data network;

determining if the transmission through the packet data network was successful; and transmitting, in response to the transmission being unsuccessful, the short message service message to the wireless device through a circuit services network.

2. The method of claim 1, further comprising:
determining, in response to the wireless device being unregistered with the registrar of the session initiation protocol network, whether the wireless device is registered with the circuit services network; and
transmitting, in response to the wireless device being registered with the circuit services network, the short message service message to the wireless device through the circuit services network.

3. The method of claim 1, further comprising:
receiving a notification, prior to receiving the request, that the wireless device is registered with the registrar associated with the session initiation protocol network; and
receiving session initiation protocol contact information associated with the wireless device for transmitting the at least one short message service message to the wireless device.

4. The method of claim 1, further comprising:
subscribing to an event registration package at a registrar associated with a packet data network; and
receiving, in response to subscribing to the event registration package, at least registration information associated with the wireless device.

5. The method of claim 1, wherein the determining if the wireless device is registered with the registrar further comprises:
determining if session initiation protocol contact information associated with the wireless device has been received.

6. The method of claim 1, further comprising:
subscribing to a registration event package for receiving a session initiation protocol network registration notification associated with the wireless device.

7. The method of claim 1, further comprising:
receiving, at a short message service center, a message that notifies an application server is required at the short message service center for transmitting short message service messages to the wireless device.

8. The method of claim 1, wherein determining whether the wireless device is registered with the registrar comprises determining, based on the locally maintained registration information and prior to receiving the request, whether the wireless device is registered with the registrar.

9. The method of claim 1, wherein locally maintaining comprises receiving the registration information from a call session control function.

10. The method of claim 9, wherein receiving the registration information from a call session control function comprises:
receiving, by the call session control function, filter criteria as part of an authorization of the wireless device; and
based on the filter criteria, providing the registration information to the short message service center.

11. A method, with a wireless device, for transmitting a short messaging service message, the method comprising:
determining, by a wireless device, whether it is currently registered with a registrar associated with a session initiation protocol network for communicating over a packet data network and a circuit services network;
transmitting, in response to being registered with the registrar, at least one short message service message through the session initiation protocol network communicating over the packet data network to at least one wireless device;
determining if the transmission through the packet data network was successful;
transmitting, in response to the transmission being unsuccessful through the packet data network, the short message service message to the wireless device through the circuit services network; and
transmitting, in response to being unregistered with the registrar, the at least one short message service message through a circuit services network to the at least one wireless device.

12. A method, with a wireless device, for receiving a short message service message, the method comprising:
receiving at least one short message service message;
determining if the received at least one short message service message was delivered through one of a packet data network and circuit services network;
transmitting, in response to the received at least one short message service message being delivered through the circuit services network, an acknowledgement message through the circuit services network to the short message service center for indicating reception of the received at least one received short message service message;
determining, in response to the received at least one short message service message through the packet data network, whether registration with the packet data network has been lost; and
transmitting, in response to the wireless device losing registration with the packet data network, an acknowledgement message through the circuit services network to a short message service center for indicating reception of the received at least one received short message service message through the packet data network.

13. The method of claim 12, wherein the determining that the at least one short service message was delivered through the packet data network further comprises:
determining that registration with the packet data network has been lost;
selecting to perform at least one of ignoring the received at least one short message service message and accepting the at least one short message service message.

14. The method of claim 13, wherein the accepting the at least one short message service message further comprises:
initializing a data session through the circuit services network; and
transmitting the acknowledgement message to the short message service center through the circuit services network using the data session.

15. A short message service center in a wireless communication system for delivering at least one short service message to at least one wireless device, the short message service center comprising:
- a receiver for receiving at least one short message service message request associated with a short message service message destined for reception by a wireless device;
- a memory that locally maintains, prior to receiving the request, registration information indicating whether the wireless device is registered with a registrar associated with a session initiation protocol network for communicating over a packet data network;
- a wireless device registration monitor for determining a registration status associated with the wireless device based on the locally maintained registration information;
- a network delivery selector for selecting one of a packet data network and a circuit services network for delivery of a short message service message to at least one wireless device based on the registration status of the wireless device;
- a transmitter for transmitting, in response to the selection of the packet data network, the short message service message to the wireless device through the session initiation protocol network communicating over the packet data network; and
- a transmission monitor for determining if the transmission of the short message service message to the wireless device through the session initiation protocol network communicating over the packet data network was successful, wherein if the transmission was unsuccessful, the transmitter transmits the short message service message to the wireless device through the circuit services network.

16. The short message service center of claim 15, wherein the wireless device registration monitor further determines if session initiation protocol contact information associated with the wireless device has been received.

17. The short message service center of claim 15, wherein the wireless device registration monitor subscribes to a registration event package for receiving a session initiation protocol network registration notification associated with the wireless device.

18. The short message service center of claim 15, further comprising:
- the transmitter for:
- transmitting, in response to the selection of the circuit services network, the short message service message to the wireless device through the circuit services network.

19. The short message service center of claim 15, further comprising:
- a notification receiver for receiving a notification, prior to receiving the request, that the wireless device is registered with a registrar associated with a session initiation protocol network, wherein the notification also comprises session initiation protocol contact information associated with the wireless device for transmitting the at least one short message service message to the wireless device.

20. The short message service center of claim 15, further comprising:
- an information system processor that subscribes to an event registration package at a registrar associated with the packet data network; and
- a notification receiver for receiving, in response to the processor subscribing to the event registration package, at least registration information associated with the wireless device.

21. A system comprising the short message service center of claim 15, wherein the system further includes a call session control function and wherein the short message service center receives, from the call session control function and prior to receiving the request, the registration information associated with the wireless device.

22. The short message service center of claim 19, further comprising:
- a notification receiver for receiving a notification that notifies the short message service center that it is required as an application server for transmitting short message service messages to the wireless device.

* * * * *